(12) United States Patent
Shukla (10) Patent No.: US 8,935,789 B2
(45) Date of Patent: Jan. 13, 2015

(54) FIXING COMPUTER FILES INFECTED BY VIRUS AND OTHER MALWARE

(75) Inventor: Jayant Shukla, Sierra Madre, CA (US)

(73) Assignee: Jayant Shukla, Sierra Madre, CA (US)

( * ) Notice: Subject to any disclaimer, the term of this patent is extended or adjusted under 35 U.S.C. 154(b) by 1358 days.

(21) Appl. No.: 12/504,970

(22) Filed: Jul. 17, 2009

(65) Prior Publication Data

US 2010/0031361 A1    Feb. 4, 2010

Related U.S. Application Data

(60) Provisional application No. 61/082,318, filed on Jul. 21, 2008.

(51) Int. Cl.
  *G06F 11/00* (2006.01)
  *H04L 29/06* (2006.01)
  *G06F 21/56* (2013.01)

(52) U.S. Cl.
  CPC ............ *G06F 21/568* (2013.01); *G06F 21/567* (2013.01)
  USPC ............................................ 726/24; 713/164

(58) Field of Classification Search
  CPC ............................... G06F 21/568; G06F 21/567
  USPC ............ 717/127, 124; 726/2, 4, 5, 21, 22, 24, 726/25, 27; 713/130, 139, 143, 153; 711/163, 164; 709/219, 227, 228, 229; 707/4, 21, 38, 219; 714/38
  See application file for complete search history.

(56) References Cited

U.S. PATENT DOCUMENTS

| | | | | |
|---|---|---|---|---|
| 7,437,764 | B1 * | 10/2008 | Sobel et al. | 726/25 |
| 7,802,310 | B2 * | 9/2010 | Farber et al. | 726/28 |
| 7,861,300 | B2 * | 12/2010 | Arnold et al. | 726/22 |
| 7,917,481 | B1 * | 3/2011 | Kale et al. | 707/693 |
| 7,984,429 | B2 * | 7/2011 | Hunt | 717/130 |
| 8,131,871 | B2 * | 3/2012 | Paggen | 709/238 |
| 8,220,050 | B2 * | 7/2012 | Sarathy | 726/22 |
| 8,281,398 | B2 * | 10/2012 | Ness et al. | 726/23 |
| 8,312,547 | B1 * | 11/2012 | Sobel et al. | 726/24 |
| 8,316,445 | B2 * | 11/2012 | Liske | 726/23 |
| 8,468,244 | B2 * | 6/2013 | Redlich et al. | 709/225 |
| 8,650,648 | B2 * | 2/2014 | Howard et al. | 726/24 |
| 8,661,541 | B2 * | 2/2014 | Beck et al. | 726/23 |
| 8,745,744 | B2 * | 6/2014 | Saika | 726/24 |
| 2004/0237071 | A1 * | 11/2004 | Hollander et al. | 717/124 |
| 2005/0086192 | A1 * | 4/2005 | Kodama | 707/1 |
| 2006/0277288 | A1 * | 12/2006 | Kelly et al. | 709/223 |
| 2006/0288412 | A1 * | 12/2006 | Arnold et al. | 726/22 |
| 2007/0240218 | A1 * | 10/2007 | Tuvell et al. | 726/24 |
| 2008/0134158 | A1 * | 6/2008 | Salz et al. | 717/148 |

(Continued)

OTHER PUBLICATIONS

Carsten et al, Toward Automated Dynamic Malware analysis using CwSandbox, 2007 IEEE, p. 32-39.*

*Primary Examiner* — Abu Sholeman (57) ABSTRACT

The disclosed invention is a new method and apparatus for detecting and removing virus from a computing device based on a web or network service. Virus is detected by transmitting the attributes and behavior of application modules on a computing device to another computing device via a web service, where it is analyzed. After the item has been classified, that information is sent back to the computing device along with the instructions on how the remove the virus. Along with the instructions on virus remediation a clean copy of the file or a network location of the clean copy can be sent.

5 Claims, 7 Drawing Sheets

(56) References Cited

U.S. PATENT DOCUMENTS

| | | | |
|---|---|---|---|
| 2008/0208935 A1* | 8/2008 | Palliyil et al. | 707/204 |
| 2008/0209562 A1* | 8/2008 | Szor | 726/24 |
| 2008/0256633 A1* | 10/2008 | Arnold et al. | 726/22 |
| 2009/0064329 A1* | 3/2009 | Okumura et al. | 726/22 |
| 2009/0249482 A1* | 10/2009 | Sarathy | 726/22 |
| 2009/0249484 A1* | 10/2009 | Howard et al. | 726/24 |
| 2009/0271866 A1* | 10/2009 | Liske | 726/23 |
| 2010/0175133 A1* | 7/2010 | Ness et al. | 726/23 |
| 2010/0251000 A1* | 9/2010 | Lyne et al. | 714/2 |
| 2010/0293615 A1* | 11/2010 | Ye | 726/22 |
| 2011/0035808 A1* | 2/2011 | Butler et al. | 726/27 |
| 2011/0078497 A1* | 3/2011 | Lyne et al. | 714/15 |
| 2011/0099632 A1* | 4/2011 | Beck et al. | 726/23 |
| 2012/0036569 A1* | 2/2012 | Cottrell et al. | 726/7 |
| 2012/0204242 A1* | 8/2012 | Cohen | 726/5 |
| 2013/0061323 A1* | 3/2013 | Liske | 726/23 |
| 2013/0185800 A1* | 7/2013 | Miller et al. | 726/24 |
| 2013/0333042 A1* | 12/2013 | Saika | 726/24 |
| 2014/0096250 A1* | 4/2014 | Belov | 726/23 |
| 2014/0215622 A1* | 7/2014 | Howard et al. | 726/23 |

* cited by examiner

Figure 7

FIXING COMPUTER FILES INFECTED BY VIRUS AND OTHER MALWARE

This application is derived from the provisional patent application No. 61/082,318 filed on Jul. 21, 2008 titled "Fixing Computer Files Infected by Virus and Other Malware."

BACKGROUND OF THE INVENTION

The main goal of anti-virus software is to remove virus and other malware from computing devices. Once a virus is identified by the anti-virus software, it is either removed or quarantined. This approach works reasonably well when a virus can be identified as a piece of stand alone file. Sometimes virus can become part of a file by infecting it. For example, a Microsoft Word document may get infected by a macro virus. Cleaning macro virus from the document is a relatively simple task, but there are viruses that can infect a valid binary residing on the device. In those cases the removal or quarantine of the binary may have adverse effects on the system. In extreme cases, the system may become unusable.

Detecting and fixing an infected binary or file is not as straight forward as fixing an infected word document because the location and scope of the virus in the infected file cannot be easily determined. In addition, virus may even scramble the original byte code after infecting the file and thereby making the detection and eradication of malware essentially impossible.

Every anti-virus program available in the market today either removes or quarantines infected or malicious files as a mechanism for virus and malware remediation. These approaches do not work for file infector virus. In case of file infectors that target existing binary files, removal or quarantine of a file results into loss of functionality. In such a case users are forced to re-install or restore the operating system.

A few approaches have been suggested to fix. One such approach requires booting the computer in secondary operating system and applying fixes, but the mechanism for fix is left to the anti-virus software and clearly that does not solve the problem of complex file infectors [1]. Unfortunately these approaches are limited and somewhat impractical as the virus can contaminate the local copy. Some operating systems [2] create a snapshot and can revert back and similar approach has been proposed [3] to replace infected file with a backup copy. If the re-install or restore is done based on image files stored on the computer, there is a chance that they too may be infected and therefore it is not a good and reliable method. The re-install or restore can be done based on images files stored outside is a more robust method, but it is not very convenient.

A simple and scalable approach to cleaning infected files is needed that can remove any malware that infects an application file. One method that shows promise in fixing file infectors is to use a Web or network service to selectively update or replace the files that are deemed infected. This approach combines the ease of use, efficiency, scalability, and reliability in fixing the file infector virus.

Therefore, a need exists for systems and methods to improve detection of virus, including polymorphic and metamorphic virus, which is scalable and does not rely on the end user to make the final decision. Such a solution will not only save corporations several billion dollars each year, but it will be critical in maintaining the integrity of government and financial network infrastructure and consumer computers.

SUMMARY OF THE INVENTION

The present invention provides a new system and method for detecting polymorphic, metamorphic, all other file infector virus and fixing the infected files. This approach is scalable and significantly different from traditional approaches for virus removal. The greatest benefit of the Web service based method for solving the file infector virus problem is that it is able to remove the file infector type virus without having to re-install the entire operating system or programs.

Another advantage of the Web service approach for virus detection is that it reduces the number of steps required by the user to fix the file infector virus problem. Instead of the user having to manually reboot the computer and re-install the operating system from a removable media, the Web service identifies the infected files, downloads clean copies, and replaces the infected copies with clean copies.

BRIEF DESCRIPTION OF THE DRAWINGS

Various embodiments of the present invention taught herein are illustrated by way of example, and not by way of limitation, in the figures of the accompanying drawings, in which.

It will be recognized that some or all of the Figures are schematic representations for purposes of illustration and do not necessarily depict the actual relative sizes or locations of the elements shown. The Figures are provided for the purpose of illustrating one or more embodiments of the invention with the explicit understanding that they will not be used to limit the scope or the meaning of the claims.

DESCRIPTION OF THE PREFERRED EMBODIMENT

In the following paragraphs, the present invention will be described in detail by way of example with reference to the attached drawings. While this invention is capable of embodiment in many different forms, there is shown in the drawings and will herein be described in detail specific embodiments, with the understanding that the present disclosure is to be considered as an example of the principles of the invention and not intended to limit the invention to the specific embodiments shown and described. That is, throughout this description, the embodiments and examples shown should be considered as exemplars, rather than as limitations on the present invention. Descriptions of well known components, methods and/or processing techniques are omitted so as to not unnecessarily obscure the invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

In one embodiment of the present invention, detection and remediation of files infected with virus or any other kind of malware is achieved via a Network or Web service. The Web or network service also customizes anti-virus definition update for computing devices instead of distributing same anti-virus or any other anti-malware to all computing devices and provides a clean copy of the file.

Figure 1:
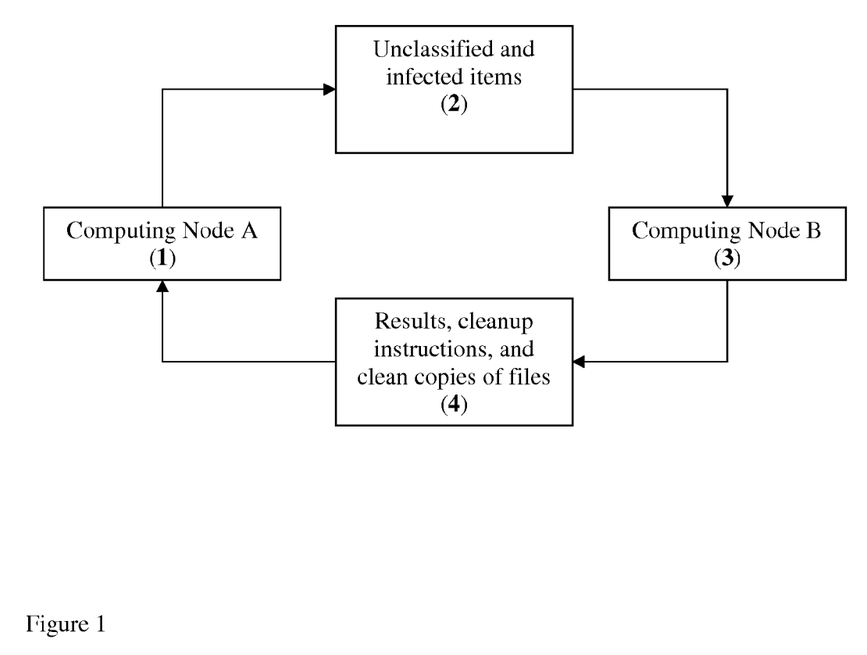
FIG. 1 illustrates the anti-virus Web service for fixing infected files where a computing node A 1 sends the list of unclassified and infected applications 2 to another computing node B 3 and receive the classification information 4 and instructions for repairing or replacing infected files that is consistent with one embodiment of the present invention.

All physical and behavioral attributes of plurality of potentially infected applications in a network accessible computing device with plurality of operating systems are monitored. The classification of the application can be made locally or at a central location. A clean copy of the infected applications is downloaded from the central location to replace the infected files. FIG. 1 shows a computing node 1 transmits the information about applications 2 to the remote computing node 3 and receives instruction on how to clean or replace 4 the files infected with virus.

To fix an infected file the first step is to ascertain that the file has been infected. Since malware can have infinite variants of signatures, the task of detecting infection is not trivial because signature matching will not yield definitive results. This problem is overcome by using expected attributes, change detection, digital signature verification, and behavior monitoring of the files. Checking the observed and expected attributes of the files with a "white list" database can provide some information to determine if the file is infected. Supplanting that information with change detection and behavior monitoring enables a much more precise determination.

In one embodiment of the present invention, any changes to a file are tracked. When a change is detected, observed attributes are compared with the permitted attributes via a local database or a Web service. If match is not detected with permitted attributes, a clean copy of the infected applications is downloaded from the central location to replace the infected files. For example, the corrective action could be triggered if the changed version fails digital signature check.

Change detection is a powerful method to detect potential malicious activity and it is used by many intrusion prevention solutions (IPS) [4]. In this embodiment, the purpose in monitoring changes is that changes to existing binaries could be a sign of file infectors. If changes are detected and identified as malicious, then corrective actions could be initiated to fix the damage. By comparing the attributes of any files that changed with permitted attributes stored in a local or remote database permits proper functioning of most installers and software updaters. If an attribute match is not successful, then the possibilities are that the file could be infected or that the file is not infected but we do not have the knowledge of new version of the file that has been changed. Such a scenario is not really a problem because if we don't have the clean version of the file, we anyway cannot remedy the infection.

Even if a clean copy of a file that may have been infected may not be available, it is still important that a method exists to detect file infector virus in a file. If we are able to monitor behavior of a file, it becomes possible to draw two important conclusions. First, if the behavior of the file has a partial or complete match with known malicious behavior, then we can conclude that the file is infected. Second, if the behavior of the file has very good match with other versions of that file, but no match with known malicious behavior, then there is a very good chance that the file is not infected and is just a new version of an old file.

If we are unable to match the observed attributes of a file with a signature database, it only means that the file is not in the list of known good or bad files. Behavior monitoring only helps determine if a file is bad or infected, but lack of match does not prove that the file is good.

There have been other attempts to detect malware in binary code modules by matching observed behavior with known malware behavior [5]. The difference is that in this embodiment, the behavior of binary code module is observed without using a virtual environment. Match is made between the observed behavior of the module and known good and bad behavior of applications. The matching and classification could be done locally or remotely via a network or Web service.

The behavior of an application is monitored from within the application and from inside the kernel. To achieve this, a module is injected into the memory space of the applications. This injected module monitors the applications file system access or network access by intercepting its API function calls through imported or exported functions table patching and inline hooking of functions at the application layer. Additionally, the injected module may monitor the applications executable content, memory access, and registry access in a like manner. In one embodiment, the behavioral monitoring method is applied to a specific module inside the application.

Figure 2:
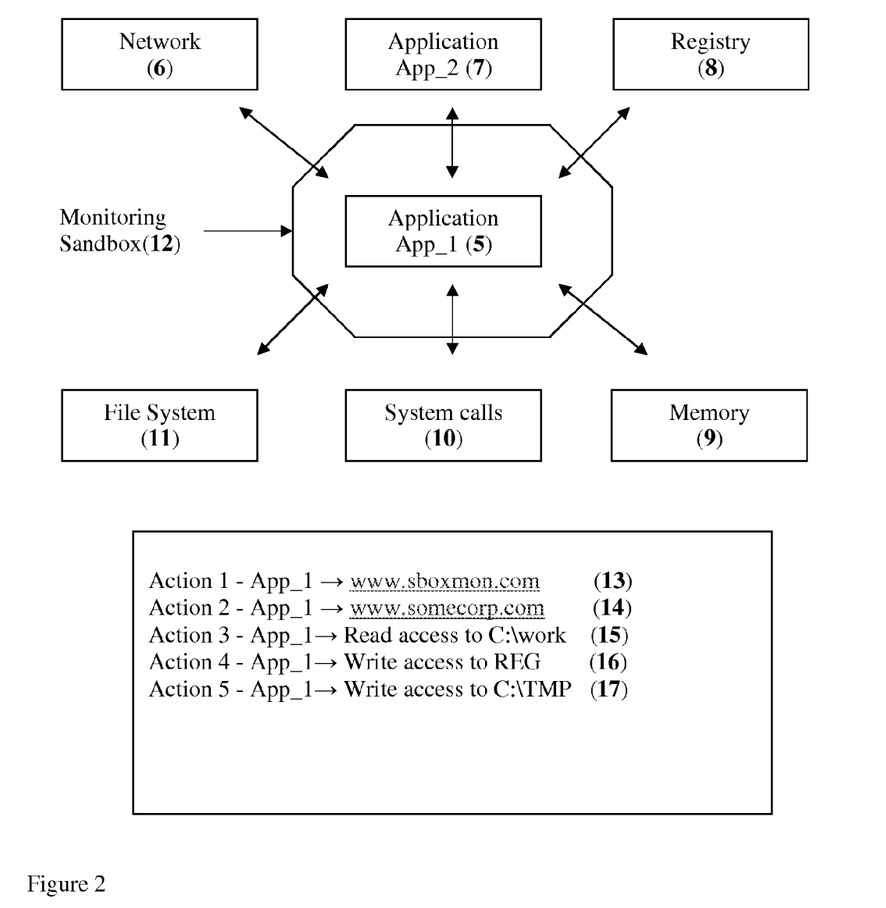
FIG. 2 illustrates construction of monitoring sandbox 9 and actions of the application 1 monitored, 13, 14, 15, 16, 17 consistent with one embodiment of the present invention.
Figure 3:
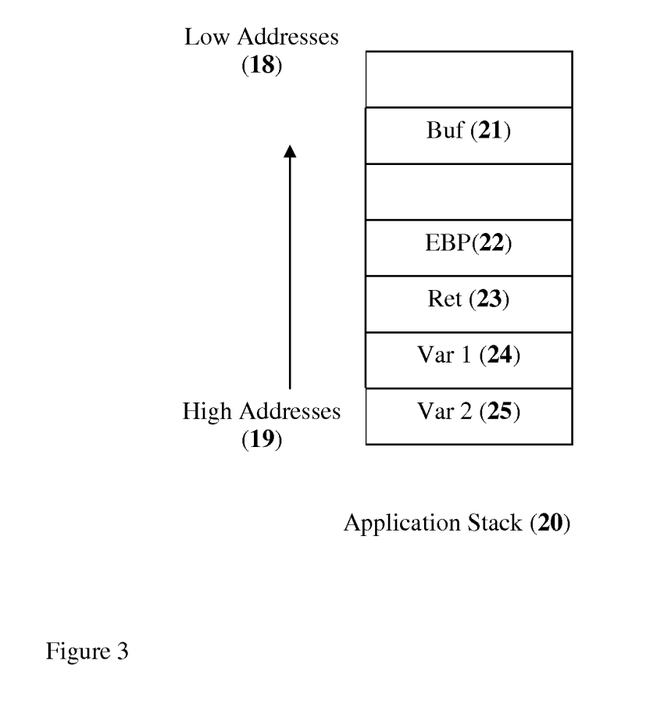
FIG. 3 shows that the stack examination to obtain the return address 23 can be used to establish the identity of the module responsible for originating an API function call.

To observe the behavior of an application or its subcomponents, application is run in a monitoring sandbox environment instead of a virtual environment. The monitoring sandbox has an application and a kernel component. As shown in FIG. 2 and FIG. 3, the monitoring sandbox observes the actions of software or malware, but does not interfere with the normal execution of the valid application 5 and allows it to function as intended. Some of the actions observed by the monitoring sandbox are registry entries 8, file system access 11, network connections 6, ability to execute code 10, etc., but are not limited to them. For anyone well versed in the art, it will be easy to understand how this concept can be applied to any computing device or application.

The monitoring sandbox 12 for any application or module, as shown in FIG. 3, is constructed by loading a module or executable code into the application 5. If necessary, another component may be loaded into the kernel. The monitoring sandbox is able to monitor the interaction of the application 5 with other components of the system 6, 7, 8, 9, 10, 11.

Figure 4:
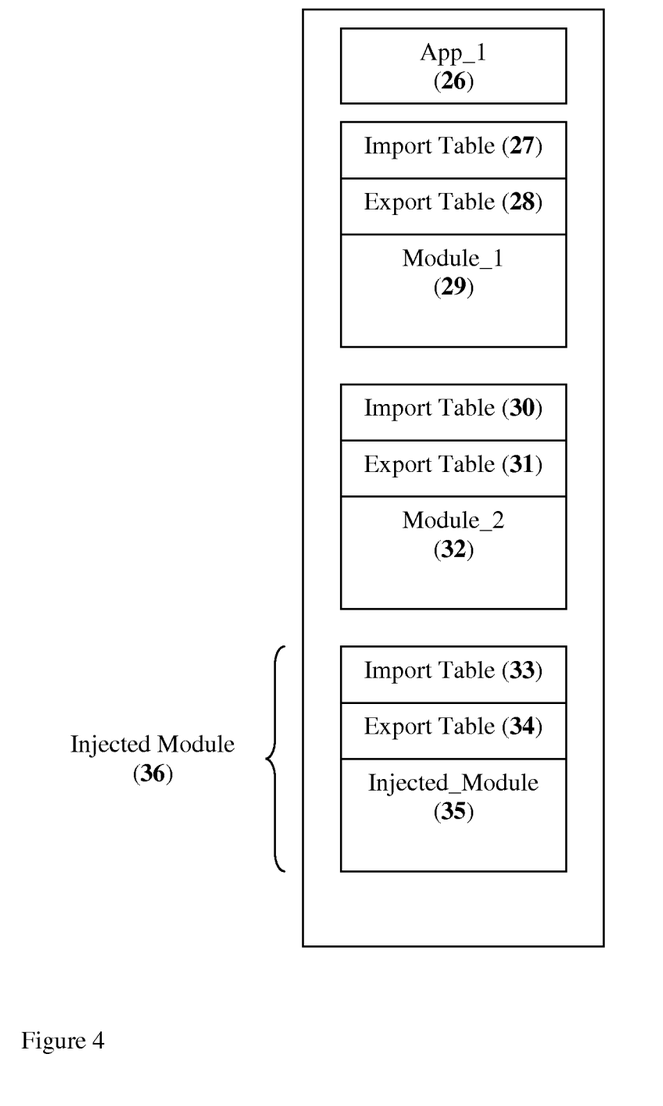
FIG. 4 illustrates how a module 36 is injected into the memory space of an application 26 that will create monitoring sandbox, consistent with one embodiment of the present invention.

FIG. 4 shows the injected module 36 that could be a dll, a driver, or a direct write into the memory space of that application or a module inside the application or a driver. This module intercepts the API function calls made by the application and its sub components and translates that into observed behavior of that application 26.

Figure 5:
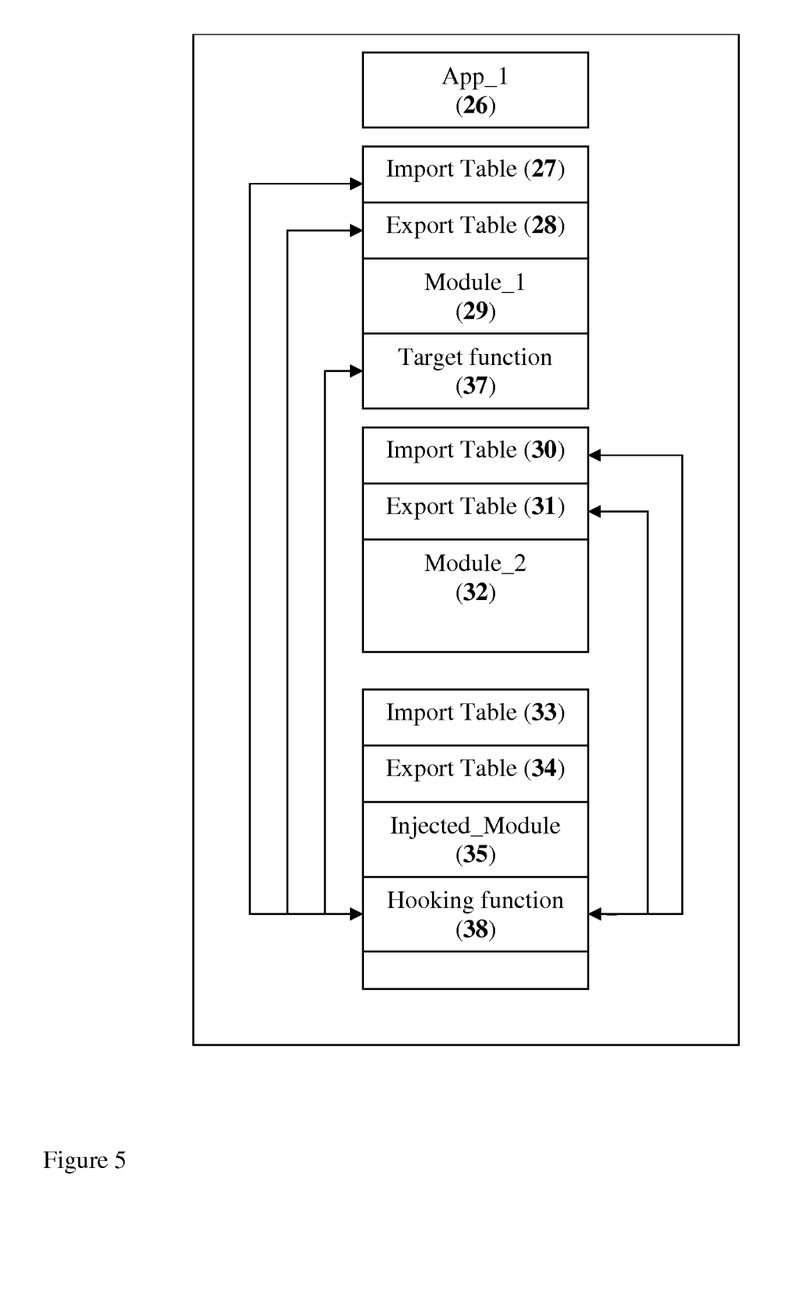
FIG. 5 illustrates how a module intercepts functions calls inside an application to create monitoring sandbox that is consistent with one embodiment of the present invention.
Figure 6:
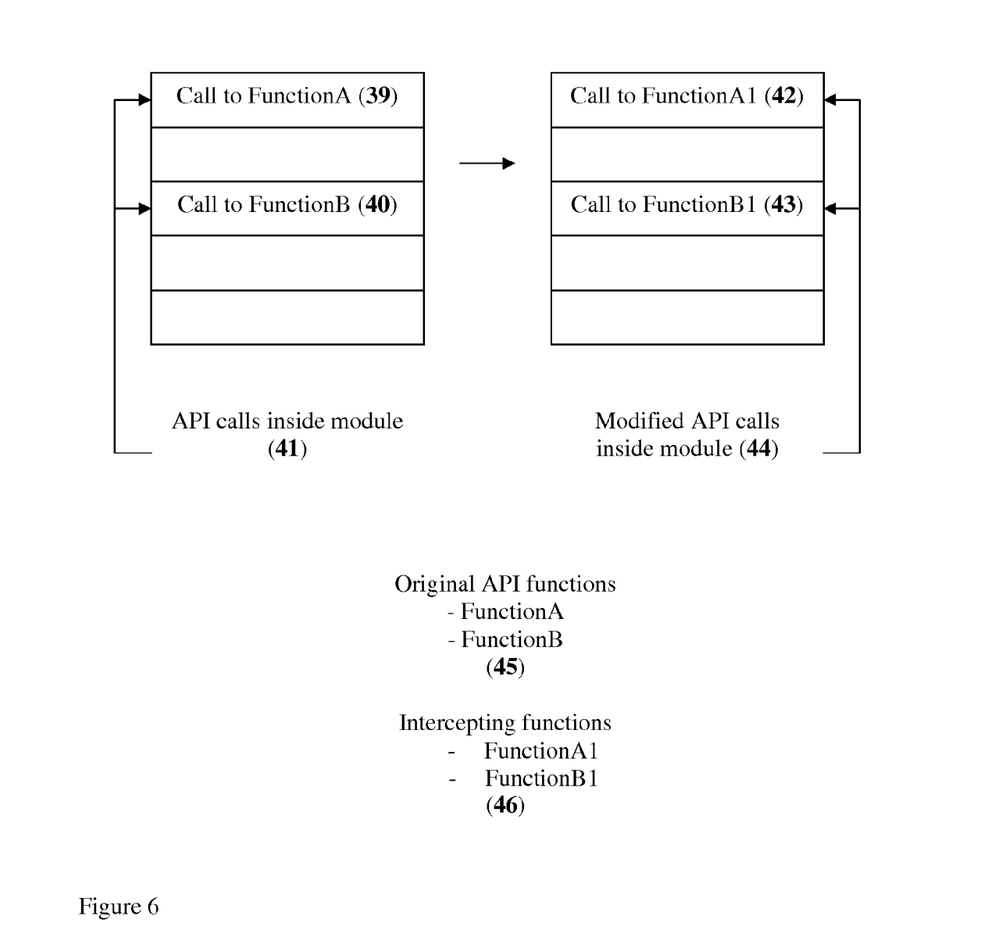
FIG. 6 illustrates the hooking of API function calls 39 40 made by a module by intercepting the function calls 42 43 inside the body of the module that is consistent with one embodiment of the present invention.

FIG. 5 shows how the injected module intercepts the targeted API function calls to create a monitoring sandbox. The interception of the API function calls can be done by modifying the import table 27, 30 or export table 28, 31 of modules inside the application or even the body of modules 29, 32. In one embodiment, the interception of the API function calls is done inside the system modules that export the API function calls.

However, in some cases it is possible to make direct kernel-mode API function calls from the application and that enables the malware, application or module inside an application, to bypass the application layer hooks created by the monitoring sandbox. To overcome this shortcoming, the monitoring sandbox has another component that resides not inside the application, but in the kernel. A second piece of the monitoring sandbox module is injected into the kernel that hooks into kernel-mode API function calls or even unexported API calls and monitors various components of the Kernel. The final observed behavior of the application is a union of the behavior observed in kernel and in the application.

Figure 7:
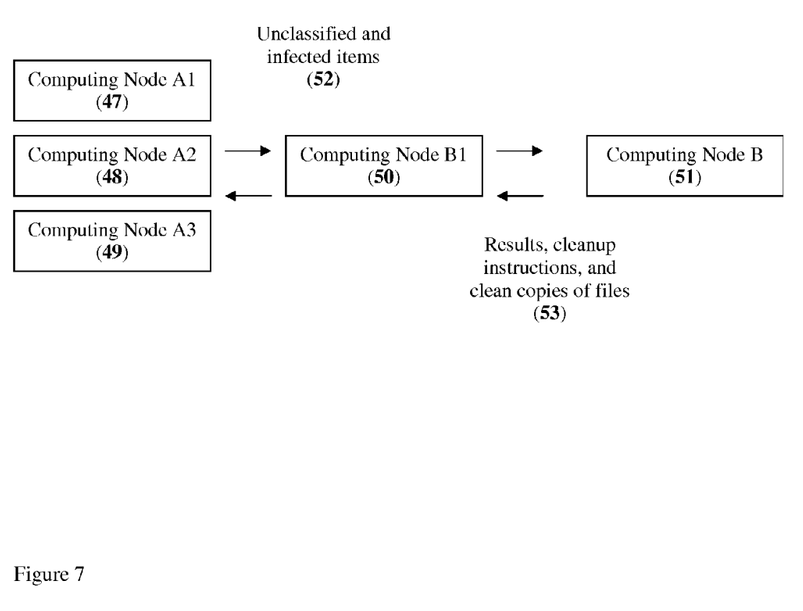
FIG. 7 illustrates the anti-virus Web service for fixing infected files where an intermediate computing node 50 acts as a proxy between plurality of reporting nodes 47, 48, 49 and processing node 51.

Implementation of the monitoring sandbox inside the kernel is a little different from the application layer, but the principle is same. The slight difference arises because it is possible to load applications or modules inside the kernel so that it does not appear as a separate application. These modules are known as drivers. Because drivers execute as part of the kernel, they have full access to memory, direct access to kernel-mode APIs, and greater privileges. Therefore, a malicious driver can do significantly more damage compared to an application. Unlike an application, it is not possible to inject a module into the driver and create a monitoring sandbox. As shown in FIG. 7, we overcome this obstacle in creating a monitoring sandbox for module or driver in the kernel by scanning the memory space of the driver and hooking into the API calls made by the driver.

To make an association between the API call and the driver module, inline hooks for the API calls are created by replacing the API call with an intercepting API call. Inside the intercepting API call, the return address on the stack or a cookie is examined that to determine the identity of the kernel module that made the API call. The x86 architecture traditionally uses the EBP register 22 to establish a stack frame, as shown in FIG. 3, and from that we can obtain the return address 23 stored in the registers which in turn yields the identity of the module responsible for that API function call. Same method can be applied to any other central processing unit (CPU) architecture. Then, based on a rule set, the original API call is allowed to proceed or blocked. With this approach, a monitoring sandbox for kernel components, such as drivers, can be created in a manner identical to that for applications. In one embodiment of the present invention the same method to identify modules inside an application responsible for any API function calls is used.

An extension of this method is used to make an association, in kernel, between the observed kernel layer API call and the application that originated that call.

To improve the efficiency of the function API call tracing, the in memory location of all modules is stored in a lookup table. The modules can be a driver, kernel, application, or a dll. Periodic polling and interception of API function calls to create new processes, load drivers in kernel, and loading of modules in process are used to keep the lookup table up-to-date.

Once the injected module 36 is loaded in the application, several methods are used to ensure that the monitoring sandbox will intercept the target API function calls. The first method is to patch the import 27, 30 and export 28, 31 tables. Import/export table contains the address of the API functions used by the application are located at the beginning of the application and at the beginning of every module inside the application. Table is located by looking up the portable executable (PE) format. Table patching, must be done for every module inside the application. To patch a function, the import and export function tables are scanned for the target function name. The address of the function is replaced by the address of the function that patches it and the original address of the target function is used by the intercepting function to jump to the appropriate memory location.

One drawback of table patching is that it is possible for a module to make API function calls by address instead of name. That enables it to bypass our intercepting function that intercepts that function call. It is also possible to make an API function call by statically or dynamically obtaining the address of the function and making a call directly. In that case, the used API function will not be listed in the import table.

Inline hooking of the target API function calls is used to ensure that the malware is not able to bypass the monitoring sandbox mechanism. These functions reside inside a specific module. For example, kernel32.dll or ntdll.dll in case of Windows OS hosts many of the API functions. The procedure to create an inline hook is:

Find the memory location of the target function
Copy the first few instructions and replace with a jump statement to our function
Perform processing before the target function is called
Execute the copied instructions
Call the target function using a jump
Perform the post processing of the results returned by the target function.

With the application layer component of the monitoring sandbox in place, it becomes possible to monitor actions of the application and detect the presence of file infector virus.

To detect file infector virus, first a scan of the computing device is performed based on a locally stored signature and behavior database and any matches are classified "malicious" or "good." Some of the items covered by scan are file system, registry, and memory. If a positive identification for an application or module file is not made, that application is added to a list for "unclassified" items. Additional items are added to that list when a new process or module file is encountered that cannot be classified based on the stored signature and behavior database.

The local computing node connects to a remote Web service or establishes a network connection with another computing node that either stores or may have access to a much larger definition database. Queries about the detected "unclassified" and "infected" items are sent by the local computing node via the remote computing node. As part of the query, behavior and attributes of the applications are sent. In some cases, the application file is also sent. The information received by the remote computing device is then stored in a database.

In another embodiment, the behavior and attributes are first reported to one or more intermediate routing or management nodes that aggregate the information and then relay it to the final destination where it is processed and stored. During the process of aggregating the application information, redundant information is removed to make the reporting process more efficient. To prevent malware from blocking the behavior reporting, the IP addresses or names of the nodes are continually changed.

The remote computing node 3 has access to a much larger database. The "unclassified" items are classified using that database and an action for each "unclassified" or "malicious" 2 item prescribed. The action 4 could be to not do anything, delete the file, quarantine the file, place file in a sandbox, or replace the file.

At the remote node 3, matching and classification of any item is done in three steps. In the first step, a black/white is used to classify the items based on its attributes. This black/white list database is much larger than the one at the computing node 1. This is useful for classifying good software that is not polymorphic and for some simple file infector type virus. Software attribute matching is typically a more robust and quicker operation compared to behavior match.

In the second step, observed actions of the items are compared with a black/white list of actions stored in the database. Unlike other approaches in virus detection, the purpose of this step is to potentially identify the original file that may have been corrupted as well as the virus that may have corrupted the file. If a match is detected that is consistent with the behavior of a virus and deviates from the known behavior of the application, the application is classified as infected.

It is possible that part of all of observed behavior of the application may not match with any items in the black/white list of actions stored in the database. The third step is to compare the observed behavior of application with a second database that stores behavior of applications that have been classified. If the application is polymorphic and its behavior has been observed in completeness, then a good or near perfect match will be made with other variants of that polymorphic malware. This yields a number of applications with which the behavior of application overlaps. Based on the closeness of the match, a score is assigned to the application.

The most important component of fixing an infected file comprises of:

Matching the infected file to an uninfected version.
Obtaining a clean copy that will replace the infected file.

The matching of an infected file to an uninfected version is achieved by using version number consistency with other binaries for that application or the operating system. Once an application binary has been infected, any information from that binary is suspect. The version number of the potentially infected binary is a starting point, but expected version number of the infected binary is derived from checking consistency with version number of other files in the same directory.

In many cases, the three steps listed above may still be insufficient to classify new software. The reason could be that the software attributes and its behavior are new and therefore all attempts to automatically classify it based on matching attributes or behavior will fail. In such cases, the only option is to enable manual classification of the software. To facilitate the task of manual classification, a state exchange mechanism is used between the client and a server. In the first step, the local computing device reports the attributes, binary, and observed behavior of the application to the remote computing device. This includes, but is not limited to application name, size, hash, network activities, file system activities, etc. The state could be stored in a file on a removable media to be transported to the remote computing node.

The remote computing node to which information is reported to could be a web server or an appliance. The received information is displayed at the remote computing node inside an application or a Web page. When the information is reported to the remote computing node, the attributes of the reporting computing node are extracted based on the information contained inside the state exchange report or based on the authentication information of the network connection over which the information was received. Based on the attributes of the reporting device, the received information is stored in an indexed database or file system.

From the application or the Web page, an action is prescribed for each item contained in the state exchange report. The action could be to not do anything, delete the item, quarantine the software, place software in a sandbox, or replace the item. In case the item is to be replaced with a clean copy, the location of the clean copy is inserted in the state exchange report.

The results of software classification based on behavior, binary, or manual analysis are returned to the local computing device by using either a pull or a push method. Both methods have their advantages and disadvantages.

Push method is more efficient as the classification may take a while and it the client continues to poll to obtain results, it will incur additional CPU and bandwidth cost at the server. However, for the push based method to work, the server must be able to connect to the client and that may not be possible in many situations e.g., the client might be behind a NAT firewall.

Pull based method is more reliable as the client can always reach the server. To anyone proficient in the art, it is obvious that either mechanism can be used to transmit the results to the client.

After the classification of the software is done and action has been prescribed, the results are updated to the client when a successful connection is established between the client and the server. The mechanism for transferring the information can be done one item at a time or all items together. Along with the results, additional files may be transferred to the client. These files could be replacement for the corrupted files or it could be a program that will perform the repair task.

After obtaining the results, a cleanup mechanism is initiated at the computing node 1. The cleanup process can vary based on how the results were reported back to the client. If results were reported for specific software, then the prescribed action is taken for that specific software only. If the result were reported back for the entire computer, then the client compares the current state of the computer with the state encoded in the received results. The computing node matches the items for which an action has been prescribed and also finds any new items that were added. For the new items, it can either take a default action or it connects back to the Web service and obtains prescribed action for the newly found items. Prescribed operation for the cleanup could be deletion of the file, surgical repair of the file, or replacing the file with a clean copy. While quarantine or deletion of file to remove infections are common methods employed by many anti-virus software, the binary pair and replacement are not employed by any other anti-virus product.

The repair of the file is possible in very rare circumstances when a simple deterministic algorithm can be applied to fix a file. For example, malware adds a new code section and changes the entry point. Such an infection can be easily removed by restoring the entry point and deleting the additional code section. A user well versed in art will notice that repair of the file is similar to signature-based detection of malware and is essentially futile in face of truly polymorphic malware where exact signature may not even be available.

The last method for cleanup is replacing the infected file. Replacing the infected file with a clean copy is a guaranteed method to remove malware. The process of replacing a file is more complex as malware may be actively interfering with the removal of the infected file.

A virus can prevent any infected file from getting cleaned by creating a race condition where the file is re-infected as soon as it is cleaned. To protect against such virus, we use a lockdown mechanism. In the lockdown mechanism, only the authorized applications are allowed to start and modify files. Modifications of files by third party software are blocked. Additional restrictions may be imposed to prevent creation or modification of file system resources, registry, and network connections.

The lockdown is enforced based on a reference state or it could even be stateless. Reference state is a snapshot of the computer that classifies applications. The database could be locally or remotely stored. Every time a new process starts or a persistent change to a file is attempted, the action is checked with the reference state and allowed or denied based on the action specified in the reference state.

Additionally all actions blocked during the lockdown are logged and displayed in the graphical user interface to track down the source of actions being blocked. Any blocked item can be unblocked by clicking on the "Allow" action option. When a user selects "Allow" action for the blocked action, reference file is updated to allow that action.

The lockdown could be enforced for a specific duration or until a predetermined event takes place. The lockdown can be engaged or disengaged by sending a message to the computer from a central location.

Lockdown also shields the modifications being made to the files to reduce the chances of virus interfering the process of file repair.

Thus, it is seen that systems and methods for (repeat the problem that you are solving) are provided. One skilled in the art will appreciate that the present invention can be practiced by other than the above-described embodiments, which are presented in this description for purposes of illustration and not of limitation. The specification and drawings are not intended to limit the exclusionary scope of this patent document. It is noted that various equivalents for the particular embodiments discussed in this description may practice the invention as well. That is, while the present invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims. The fact that a product, process or method exhibits differences from one or more of the above-described exemplary embodiments does not mean that the product or process is outside the scope (literal scope and/or other legally-recognized scope) of the following claims.

REFERENCES

[1] Challener, et al, "Automatic virus fix." US patent application 20050138159.
[2] How to restore the operating system to a pervious state in Windows XP? http://support.microsoft.com/kb/306084.
[3] Claudautos, et al, "Method and system for detecting malware." US patent application 20080047013.
[4] Tripwire.
www.tripwire.com
[5] Bodrin, et al, "System and method for detecting malware in an executable code module according to the code module's exhibited behavior." US patent application 20050188272.

What is claimed:

1. A method for creating list of infected, malicious, and unclassified software or modules or applications on a computing device for a purpose of obtaining a classification and remedial action on the applications, software or modules from a remote computing node, comprising steps of:
assigning a unique identifier to the computing device;
listing items in file system, registry, and memory of the computing device;
listing attributes of the listed items;
computing cryptographic hash of the listed items;
matching the attributes of the listed items with a local black/white list database;
applying a filter to reduce the listed items;
storing the unique identifier and filtered items along with the attributes of the listed items;
classifying the filtered items and storing the classified items in graphical user interface or machine readable format and taking the remedial action on the classified items;
transmitting the stored the classified items and application files to the remote computing node;
based on the classification of the classified items, placing plurality of the application files of a computer system placed into a sandbox using intercepting API function calls using imported or exported functions table patching and inline hooking of functions that restrict actions on the classified items while the application files are in the computing device until a cleanup task is completed;
and placing the computing device in a restricted mode that limits modifications of the application files until the task of repairing infected application files of the computer device is completed.

2. A method for monitoring behavior of plurality of applications or modules in applications on a computing device that have not been classified based on attributes, comprising steps of:
injecting a module into a memory space of the applications;
the injected module monitoring said applications' file system accesses by intercepting API function calls via imported or exported functions table patching and inline hooking of functions at application layer of the applications;
the injected module monitoring said applications' network accesses by intercepting API function calls via imported or exported functions table patching and inline hooking of functions at the application layer of the applications;
the injected module monitoring said applications' executable content loading by intercepting API function calls via imported or exported functions table patching and inline hooking of functions at the application layer of the application;
the injected module monitoring a memory access by the applications via inline hooks in API function call and application programming interface functions provided;
and the injected module monitoring a registry access by the applications via inline hooks in API function call and application programming interface functions provided and observing the behavior of the applications over a time period;
and the observed behavior of the applications over a time period is displayed in a graphical user interface or stored in a file.

3. A method for applying remedial action on applications on a computing device based on observed changes, comprising steps of:
listing items in a file system, registry, and memory of the computing device;
listing attributes of the items and matching items with a black/white list database;
observing behavior of the listed attributes of the items;
classifying the listed attributes of the items based on the observed behavior of the listed attributes of the items;
taking a remedial action on based on the classification of the listed attributes of the items;
creating a reference state by storing the observed behavior, listed attributes, behavior, classification, and remedial action for the items in a graphical user interface or machine readable format;
periodically comparing the listed attributes of the items and the observed behavior of the listed attributes of the items with the behavior and listed attributes stated in the reference state to detect changes;

the applications's binaries, the reference state of the listed attributes of the items, and a current state of the listed attributed of the items are transmitted to a remote computing node where a change analysis is performed on the reference state of the listed attributes of the items;

the analyzed reference state is returned to the computing device along with clean copies of the applications to revert or fix observed changes;

placing any unclassified or malicious items of the file system, registry, and memory of the computing device in a sandbox using intercepting API function calls, imported or exported functions table patching and inline hooking of functions that restricts actions of the unclassified or malicious items;

and the unclassified or malicious items are replaced with a clean copy received from the remote computing node;

and replacing all changed or infected items of the file system, registry and memory of the computing device with a clean copy stored locally or retrieved from the remote computing node.

4. A method for removing virus hidden inside applications and fixing infected files comprising steps of:

establishing a network connection to a remote computing node and receiving a list containing application names, attributes, classification, and remedial action to be performed;

initiating a lock down mechanism to prevent unauthorized system and file modifications;

scanning a file system, registry, and memory of a computer for any executable content;

classifying items of the executable content;

detecting a change in the items of the executable content;

comparing the items with the received list;

applying a remediation mechanism prescribed for the items in the received list;

default action is applied to every detected item that is not listed in the received list;

remedial action is to replace plurality of files of the executable content with a clean copy received or by downloading the clean copy from a specified network location;

a network connection is made to the remote computing node to obtain classification of every new detected item that is not listed in the received list;

unclassified or malicious applications from the received list are placed in a sandbox using intercepting API function calls, using imported or exported functions table patching and inline hooking of functions that restrict actions of the unclassified or malicious applications on the computer until an updated list, in part or entirety, is returned to the computer from the remote computing node;

and clean copies or the network location of the clean copies of the plurality of the applications are received by the computer to replace the infected files of the executable content.

5. A method for enforcing lockdown state on computer for a purpose of removing virus, comprising steps of:

scanning a file system, registry, installed programs, and memory of the computer and creating a reference state;

preventing modifications to sections of the registry or file system of the computer that may enable malware to start itself upon rebooting of the computer by intercepting application and kernel layer calls;

prohibiting creation of any process not listed in a reference list by intercepting an API function call for creating new processes;

prohibiting creation of network connections by any module not listed in the reference list by intercepting the API function call for creating new network connections;

prohibiting loading into the memory of the computer, any module not listed in the reference list by intercepting the API function call for loading modules;

prohibiting injection of a module into a memory space of any executing application by intercepting the API function call for loading modules via inline hooking;

prohibiting creation or modification of the registry for starting programs and modification of executable files by intercepting the API function call for modifying the executable files and registry;

checking any action during the lockdown state on the computer against a white list and allowing the action to take place if the action is found in the white list;

disabling the lockdown state after a cleanup process has been completed.

* * * * *